United States Patent Office 3,345,312
Patented Oct. 3, 1967

3,345,312
ACRYLAMIDE MODIFIED OILS
Oliver I. Cline, Jr., Louisville, Ky., assignor, by mesne assignments, to Celanese Coatings Company, a corporation of Delaware
No Drawing. Filed Feb. 3, 1964, Ser. No. 342,289
17 Claims. (Cl. 260—21)

This invention in one of its aspects relates to drying oils, modified by condensation with acrylamides or methacrylamides. In another of its aspects, the invention pertains to the condensation of N-alkoxymethylacrylamides with drying oils.

Drying oils have been important components of protective coating compositions for a considerable number of years. Although drying oils have many desirable properties, they also have some inherent weaknesses. They are relatively slow drying and produce soft films. Successful processes have been developed for modifying the oils to increase the rate of drying and to improve the hardness of the films. Such process may involve changes in the structure of the oil molecule, or they may involve the addition of other constituents such as maleic anhydride or styrene. These oils are then referred to as treated, styrenated, copolymer or synthetic oils. Usually, the modified oils also have better water and chemical resistance than the original natural oils, as well as faster drying properties.

Copolymerized oils, that is, oils which have been coreacted with a vinyl monomer, for example styrene, vinyl toluene, or cyclopentadiene, have excellent drying properties and are hard and tough. However, these modifiers do not improve the solvent resistance and heat stability of the copolymerized oils. The cross-linking density of films of copolymerized oils is not increased since the modifiers are thermoplastic in nature and only increase the molecular weight of the components.

Maleinized oils, that is, oils which have been coreacted with maleic anhydride, are faster bodying than the unmodified oils and have improved color. In addition, maleinized oils contain reactive acid or anhydride groups which can be utilized in cross-linking reactions. By the addition of compounds which react with acids or anhydrides, such as polyepoxides, cured films with high cross-linking densities can be obtained. However, there are disadvantages to adding these cross-linking agents, such as problems relating to compatibility and storage stability of the blends or mixtures.

In accordance with this invention, a modifier is provided which is not subject to the disadvantages of copolymerized and maleinized oils. The invention is concerned with acrylamide modified drying oils. There is provided herein a drying oil modified with 10 to 40 weight percent of the acrylamide. The acrylamides contemplated are acrylamide itself, methacrylamide and N-alkoxymethyl substituted methacrylamide or acrylamide, the alkoxy group having less than 10 carbon atoms.

The acrylamide modified oils of this invention can be considered similar to styrenated oils in that the modifier is a vinyl monomer. However, the use of the acrylamide in these compositions has the advantage over the styrenated types in that cross-linked compositions can be made. The compositions of this invention are self-curing in some instances, and in others, additional curing agents can be added to the compositions. In other words, the type of curing depends upon the particular acrylamide. If the drying oil is modified with the acrylamide or methacrylamide, it can be cross-linked with aminoplasts, phenolplasts, and the like which react through active hydrogen atoms. If the drying oil is N-alkoxymethyl acrylamide modified it can be cured with or without the additional curing agents.

Since the co-reaction of acrylamide monomers and drying oils can be considered analogous to the co-reaction of styrene and drying oils, the mechanisms of the reactions are of a similar nature, being the allylic type addition. The acrylamide monomer, which can be acrylamide, methacrylamide, N-alkoxymethylacrylamide or N-alkoxymethylmethacrylamide, is heated with a drying oil to a temperature in excess of 180° C. until the condensation is complete. The completeness of reaction is determined by the disappearance of the vinyl unsaturation peaks at 6.2, 10.1 and 11.9 microns in the infra-red spectrum of the condensate. When N-alkoxymethylacrylamide is the monomer condensed with the drying oil, the product is ready for use. However, when acrylamide is the monomer, and the N-alkoxymethylacrylamide is desired, the condensate is further reacted with formaldehyde and an alkanol at a pH slightly below 7 in order to produce the compositions of the invention.

The reaction of acrylamide and methacrylamide, or their polymers and copolymers, with formaldehyde and an alkanol to form N-alkoxymethyl compounds is well known and need not be dwelt upon in detail. For example, if acrylamide is reacted with formaldehyde and isopropanol, N-isopropoxymethylacrylamide results. Alcohols which can be used to form the alkoxy group are monohydric alcohols having less than ten carbon atoms. Such alcohols include methanol, ethanol, isopropanol, butanol, pentanol, hexanol, 2-ethyl-hexanol, n-octanol, and the like.

Due to the high polarity and insolubility of polyacrylamides, the co-reaction of the acrylamide monomer and a drying oil must be conducted under conditions to minimize homopolymer formation. In forming the compositions of this invention, homopolymerization of the acrylamide monomer is minimized by carrying out the reaction without a free radical catalyst, and by using a temperature high enough to promote allylic addition of the acrylamide to the oil, said temperature being in excess of 180° C.

The drying oils contemplated for use in this invention are the drying oils which undergo styrenation reactions. Such oils include semi-drying as well as drying oils. Hence, the drying oils, which can be modified with an N-alkoxymethylacrylamide are perilla oil, safflower oil, soybean oil, sunflower oil, tung oil, oiticica oil, dehydrated castor oil, cottonseed oil, linseed oil, tall oil, corn oil, and fish oils.

This invention can be more adequately demonstrated by the following examples, wherein the term parts, where used, is meant to refer to parts by weight.

*Example 1*

To a 1-liter flask equipped with reflux condenser, thermometer and mechanical agitator are added 210 parts of dehydrated castor oil, 90 parts of N-butoxymethylacrylamide and 300 parts of a commercial aromatic hydrocarbon mixture having a K.B. value of 100 minimum and a boiling point range of 215° C. to 270° C. The temperature is raised to 200° C. and is held at 200° C. for five hours. Infra-red analysis of the solution shows no vinyl unsaturation peaks indicating that the condensation reaction is complete. The solvent is removed by vacuum distillation and the reddish liquid product is filtered.

To the condensate are added cobalt naphthenate drier (1 percent cobalt based on the condensate) and 4 percent morpholinium butyl acid phosphate. Films are prepared on glass by application with a 1.5 mil doctor blade. The films are well cured after a thirty minute bake at 177° C., and have a pencil hardness of 2B, a rocker hardness of 13, and a color on the Hunter "b" scale of 21.9.

*Example 2*

To a 1-liter flask equipped as described in Example 1, are added 45 parts of acrylamide, 255 parts of dehydrated castor oil and 300 parts of the aromatic hydrocarbon solvent described in Example 1. Heat is applied raising the temperatrue of the reactants to 200° C. The temperature is held at 195° C. to 200° C. for five hours. Infra-red analysis of the reactants indicates complete reaction as evidenced by the disappearance of the vinyl unsaturation peaks. The reactants are cooled to room temperature and are filtered through felt to remove the small amount of solid material that had formed during the reaction. The material cures well with a commercial methylated melamine-formaldehyde resin, Cymel 300, hexamethoxymethylmelamine.

*Example 3*

A yield resulting from the preparation of Example 2, 95 parts of a Butyl Formcel (52.5 percent butanol, 7.5 percent water, and 40 percent formaldehyde) and 0.3 part of maleic anhydride are charged to a reactor. The reactor is equipped with a Dean-Starke type apparatus for the removal of water by azeotropic distillation. The Dean-Starke tube is filled with xylene and the reaction mixture is heated at 130° C. to 136 C. for two hours, after which time no more water distills over. The reactants are cooled and filtered through felt. The solvents are then removed by vacuum distillation. The solids that are removed from the reactants by filtration are equivalent to 4 percent of acrylamide in the original charge.

To the N-butoxymethylacrylamide-drying oil condensate are added cobalt naphthenate drier (1 percent cobalt based on the condensate) and 4 percent morpholinium butyl acid phosphate. Films are prepared on glass by application with a 1.5 mil doctor blade. The films are well-cured after thirty minutes at 177° C. and have a pencil hardness of 2B, a rocker hardness of 8 and a color of 17.5 on the Hunter "b" scale.

N-alkoxymethylacrylamide modified drying oils are excellent film forming compositions and will cure by heating at 150° C. to 200° C. for twenty to forty minutes. The curing reaction takes place through the interaction of the N-alkoxymethyl groups and through polymerization of any residual unsaturation in the drying oil. Excellent films can also be prepared from these compositions blended with 30 percent to 70 percent by weight of a copolymer of N-alkoxymethylacrylamide and a vinyl monomer. Such a composition is described as follows:

To 50 parts of the composition of Example 1 are added 50 parts of a copolymer, the composition of which is 50 percent styrene, 30 percent 2-ethylhexyl acrylate and 20 percent N-butoxymethylacrylamide. Cobalt naphthenate (1 weight percent cobalt based on the weight of the blend) and morpholinium butyl acid phosphate (4 weight percent based on the weight of the blend) are used as catalysts. Films are applied to glass using a 1.5 mil doctor blade and are cured by heating at 350° F. for thirty minutes. The well-cured films have a pencil hardness of 2B, a rocker hardness of 24, and a color of 18 on the Hunter "b" scale.

Acrylamide and methacrylamide modified drying oils as well as the N-alkoxymethylacrylamide can be cured in admixture with 10 percent to 50 percent by weight of alkoxymethylurea and alkoxymethylmelamine resins to produce films with excellent properties.

What is claimed is:
1. A cross-linkable condensate prepared by allylic addition, at a temperature in excess of 180° C., of

(A) from 10 to 40 weight percent, based on the total weight of said condensate, of an acrylamide monomer selected from the group consisting of acrylamide, methacrylamide, N-alkoxymethylacrylamide and N-alkoxymethylmethacrylamide, the alkoxy group in the latter two monomers having less than 10 carbon atoms, to (B) a drying oil which undergoes styrenation reactions, said allylic addition being carried out in the absence of a free radical polymerization catalyst so as to minimize homopolymerization of said (A).

2. A condensate as described in claim 1 wherein said (A) is acrylamide.

3. A condensate as described in claim 1 wherein said (A) is methacrylamide.

4. A condensate as described in claim 1 wherein said (A) is an N-alkoxymethylacrylamide.

5. A condensate as described in claim 1 wherein said (A) is N-butoxymethylacrylamide.

6. A condensate as described in claim 1 wherein said (A) is N-alkoxymethylmethacrylamide.

7. A condensate as described in claim 1 wherein said (A) is N-butoxymethylmethacrylamide.

8. A condensate as described in claim 1 wherein said (B) is dehydrated castor oil.

9. A condensate as described in claim 1 wherein said (A) is acrylamide which is present in the amount of 15 weight percent, based on the total weight of said condensate, and said (B) is dehydrated castor oil.

10. A condensate as described in claim 1 wherein said (A) is N-butoxymethylacrylamide which is present in the amount of 30 weight percent, based on the total weight of said condensate, and said (B) is dehydrated castor oil.

11. A heat-curable coating composition comprising, in solution, a cross-linkable condensate prepared by allylic addition, at a temperature in excess of 180° C., of (A) from 10 to 40 weight percent, based on the total weight of said condensate, of an acrylamide monomer selected from the group consisting of acrylamide, methacrylamide, N-alkoxymethylacrylamide and N-alkoxymethylmethacrylamide, the alkoxy group in the latter two monomers having less than 10 carbon atoms, to (B) a drying oil which undergoes styrenation reactions, said allylic addition being carried out in the absence of a free radical polymerization catalyst so as to minimize homopolymerization of said (A).

12. A heat curable coating composition comprising a compatible mixture of the condensate solution of claim 11 and a copolymer of N-alkoxymethylacrylamide and a vinyl monomer copolymerizable therewith, said mixture containing 30 percent to 70 percent by weight of said condensate and 70 percent to 30 percent by weight of said copolymer, the total being 100 percent.

13. A heat-curable coating composition as described in claim 12 wherein said (A) is an N-alkoxymethylacrylamide.

14. A heat-curable coating composition as described in claim 12 wherein said (A) is N-butoxymethylacrylamide and said (B) is dehydrated castor oil.

15. A heat curable coating composition comprising a compatible mixture of the condensate solution of claim 11 and an aminoplast resin, said mixture containing 50 percent to 90 percent by weight of said condensate and 10 percent to 50 percent by weight of said copolymer, the total being 100 percent.

16. A heat-curable coating composition as described in claim 15 wherein said (A) is an N-alkoxymethylacrylamide.

17. A heat-curable coating composition as described in claim 15 wherein said (A) is N-butoxymethylacrylamide and said (B) is dehydrated castor oil.

References Cited

UNITED STATES PATENTS

| | | | |
|---|---|---|---|
| 1,893,874 | 1/1933 | Adams | 260—22 |
| 2,452,029 | 10/1948 | Bruson et al. | 260—23 |
| 2,928,796 | 3/1960 | Heckles | 260—22 |
| 3,166,524 | 1/1965 | Schmidle et al. | 260—23 |
| 3,222,309 | 12/1965 | Sekmakas | 260—72 |
| 3,222,321 | 12/1965 | Sekmakas | 260—72 |

DONALD E. CZAJA, *Primary Examiner.*

R. W. GRIFFIN, *Assistant Examiner.*